Dec. 15, 1970 E. R. IDE ET AL 3,548,202

ADAPTIVE LOGIC SYSTEM FOR UNSUPERVISED LEARNING

Filed Nov. 29, 1968 3 Sheets-Sheet 1

INVENTORS
ELEANOR R. IDE
MITCHELL P. MARCUS
CYRIL J. TUNIS
BY Paul M. Brennan
AGENT Dec. 15, 1970 E. R. IDE ET AL 3,548,202

ADAPTIVE LOGIC SYSTEM FOR UNSUPERVISED LEARNING

Filed Nov. 29, 1968 3 Sheets-Sheet 2

3,548,202

ADAPTIVE LOGIC SYSTEM FOR UNSUPERVISED LEARNING

Eleanor R. Ide, Raleigh, N.C., and Mitchell P. Marcus, Binghamton, and Cyril J. Tunis, Endwell, N.Y., assignors to International Business Machines Corporation, Armonk, N.Y., a corporation of New York Filed Nov. 29, 1968, Ser. No. 779,840
Int. Cl. G06k 9/00
U.S. Cl. 307—201 7 Claims

ABSTRACT OF THE DISCLOSURE

An adaptive logic system arranged for unsupervised learning where the adaptive logic units are of the ramp signal controlled type. A plurality of timing circuits are arranged to operate in sequence during the time that threshold logic circuits may turn on as a result of a given input pattern. Depending on whether or not one or more additional threshold circuits turn on during the time intervals set by the timing circuits, the system may or may not adapt, and will accept or reject the input.

BACKGROUND OF THE INVENTION

Adaptive logic systems employing supervised learning are known in the art. In these arrangements, a relatively large set of inputs is presented to the system while supervised learning takes place, that is to say, the system is shown the inputs and then is told what they are. The system is used thereafter for identification by showing unidentified inputs which the system then identifies with a certain maximum reliability.

The invention herein disclosed relates to adaptive logic systems which provide unsupervised learning. In this system, a relatively smaller set of input sets is presented to the system during the learning interval. Then while the system is being used for identification of unidentified inputs, unsupervised learning takes place. In the unsupervised learning, when a strong identification takes place, no further adaption is made since none is needed. However, with a weak identification, the system further adapts to strengthen the identification and thus improve the reliability of the system.

Such arrangement is advantageous because it is capable of adapting to gradual circuit changes or deterioration and to gradual changes in the inputs as well. As an example, with supervised learning only, a speech recognition system will adapt to a person's voice at a given time, but at some later date when the system is used for recognition, the natural cyclic changes which could occur in the person's speech pattern will cause a poor reliability in recognition. If on the other hand, an unsupervised learning arrangement is provided, the system will continuously adapt to the changes in the speech pattern.

SUMMARY OF THE INVENTION

The present invention is directed to an adaptive logic system which provides unsupervised learning and which employs a plurality of threshold logic units each of which receives a set of input signals corresponding, for example, to the distribution of a pattern presented to a matrix of detection cells. Within each of the threshold logic units, the input signals are acted upon to provide an output signal and in particular each of the threshold logic units acts upon the input signals differently so that for a particular set of input signals corresponding to a particular pattern, an output signal is generated by the threshold logic unit designated to correspond to the particular pattern. The threshold logic units are all interrogated to determine which of the adaptive logic circuits actually generate output signals. This output information, together with information supplied to the system indicating which pattern was actually presented for recognition, is employed to modify the threshold logic units to compensate for any erroneous output signals which may have been generated.

In a first preferred embodiment of the invention, there are provided a plurality of threshold logic units each of which corresponds to a different class of patterns to be recognized and each of which weights the input signals applied thereto and performs a suitable summation of the weighted input signals. The adaptive logic or threshold unit that generates the largest output signal for a particular set of input signals is taken as corresponding to the particular input pattern class presented for recognition, and upon the occurrence of an output from this particular unit, a timing sequence is initiated which determines whether or not other threshold units provide output signals during a predetermined time interval in which their outputs are being successively examined to see which falls within the closest range to the largest output. Two time delay circuits, such as single shot multivibrators, are provided, one having a shorter time constant and one having a longer time constant. If no other threshold circuit turns on during the duration of the longer time constant trigger signal, no adaptive action takes place and the pattern is recognized as having suitable separation to justify recognition, hence there is no further need for adaption.

If another threshold circuit turns on during the duration of the signal from the short time delay circuit or single shot, no adaptive action will take place and moreover, the pattern is rejected since there is not enough separation to consider that recognition has occurred.

If no other threshold circuit turns on during the short time delay but another turns on during the long time delay, adaptive action occurs, in which the active inputs of the first threshold circuit to turn on during the interval between the first and second delay are suitably decremented. Also the active inputs of the initial threshold circuit are incremented and the pattern is recognized as having enough separation to justify recognition in the case, but not enough separation for the desired level of reliability in the general case.

In the second preferred embodiment, three time delay circuits are provided, the first two of which function, from an adaptive standpoint, in the manner described above. The third time delay circuit is employed to control recognition or rejection only, and the system is arranged so that if any other threshold circuit turns on during the duration of the time delay signal provided by the third delay unit, the pattern is rejected. If no other threshold circuit turns on during the duration of the third time delay signal, the pattern is recognized. Such a modification is advantageous in that the operation of scheme is more general since recognition and rejection are operative independently from the adaption criteria.

A broad object of the present invention, therefore, is to provide an improved adaptive logic system for unsupervised learning.

Another object of the invention is to provide an improved adaptive logic system for unsupervised learning which requires only a small amount of apparatus to provide the unsupervised operation.

A further object of the invention is to provide an improved adaptive logic system in which unsupervised learning can take place rapidly after an initial supervised learning period is ended.

DESCRIPTION OF THE DRAWINGS

The foregoing and other objects, features and advantages of the invention will be apparent from the following more particular description of two preferred embodiments of the invention as illustrated in the accompanying drawings.

In the drawings:

Similar reference characters refer to similar parts in each of the views.

Referring to FIG. 1, an information source 20 generates signals on lines designated as *e1*, *e2*, through *en* which are input signals to the adaptive logic system 22. The input signals, for example, may be representative of the states of detection cells or other devices not shown which together form a matrix to which is presented a character for recognition. The shape, position and size of the character within the matrix determine the states of the detection cells and hence, the states of the input signals on the input lines.

Figure 1:
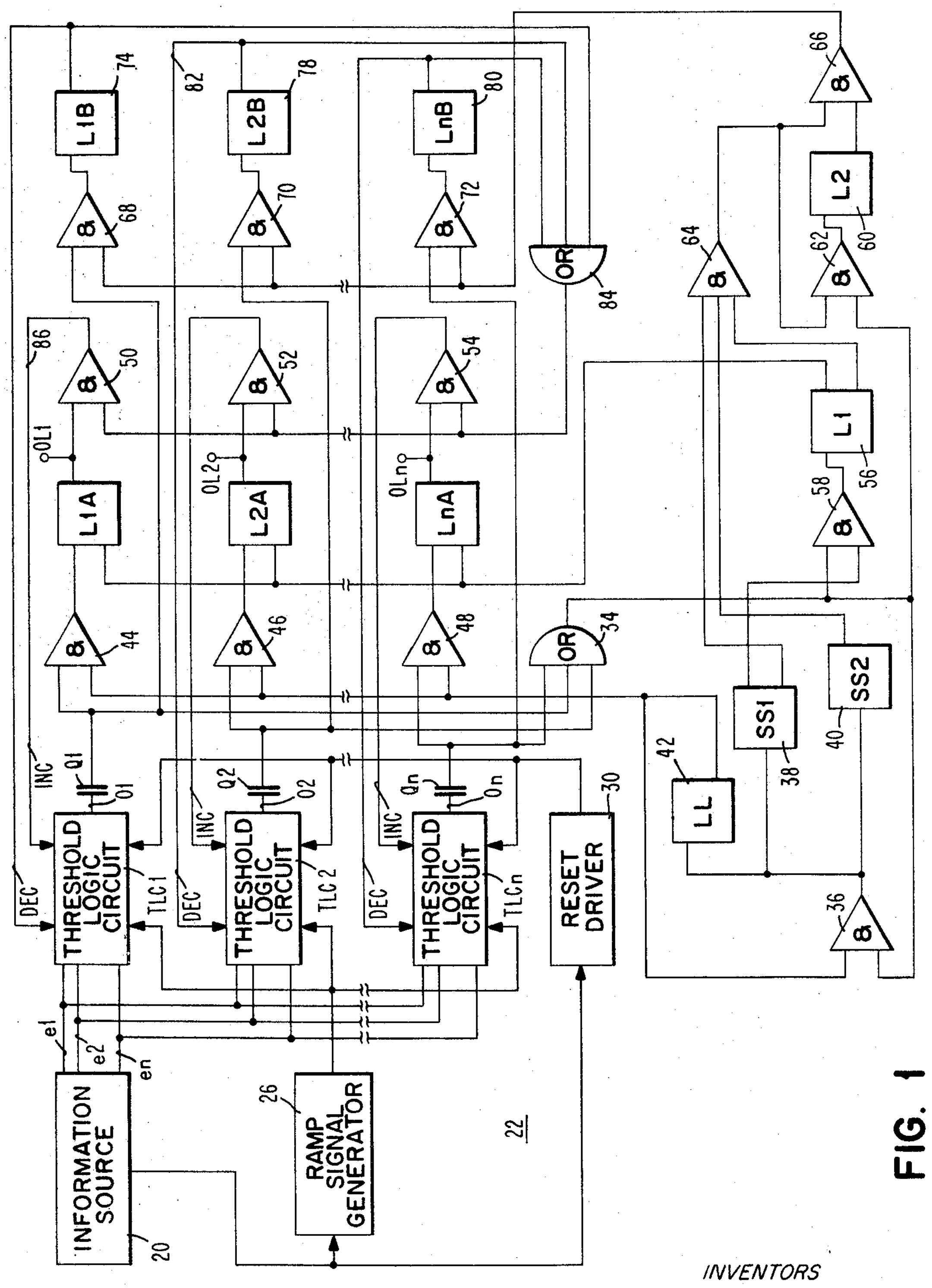
FIG. 1 shows, in schematic form, an adaptive logic system in accordance with the first embodiment of the present invention in which two time delay devices are employed.

The signals on these input lines are applied to a plurality of threshold logic circuits designated by reference characters TLC1, TLC2, and TLC*n*. In general, there will be one such threshold logic circuit for each separate entity to be recognized. For example, if the characters to be recognized are the 26 letters of the alphabet, then 26 threshold logic circuits will be required for the system. Each of the threshold logic circuits is supplied with a ramp or saw tooth signal generated by a ramp signal generator 26, such ramp signal being initiated under the control of the information source 20. The timing signal from the source 20 which governs ramp signal generator 26 is also applied to a reset driver 30 which generates a reset signal applied to each of the threshold logic circuits. The timing signal supplied from source 20 is generated each time at the signals on the lines *e1*, *e2* . . . *en* change, corresponding to a change in the character presented to the detection matrix, for example.

Each of the threshold logic circuits translates the input signals into a single output signal in accordance with the weighting and other arrangements of the threshold logic circuit. The ramp signal, which is supplied to all the threshold logic circuits is chosen so that it steadily decreases from a value which exceeds the largest signal which may be generated by any of the threshold logic circuits. At the time the ramp signal is equal to the signal generated by a threshold logic circuit, an output signal on the corresponding one of output conductors O1, O2. through O*n* is generated. The output signals are capacitively coupled by means of coupling capacitors such as Q1, QT and Q*n*, to the subsequent circuitry. The subsequent circuits include an OR circuit 34 which supplies an output signal therefrom when an output pulse is coupled thereto from any one of the threshold logic circuits. The output from OR circuit 34 is supplied via an AND circuit 36 to the inputs of two single shots 38 and 40, also designated as SS1 and SS2, respectively. The output of AND circuit 36 is also supplied to the input of a locking latch 42, also designated by the reference characters LL. It will be noted that the "off" output of the latch LL is supplied to one of the inputs of AND circuit 36, the other input being the output of OR circuit 34. When OR circuit 34 supplies the pulse through AND circuit 36, latch 42 is set to its on state, thereby removing the signal from the other input of AND 36, so that the circuitry will operate once and only once per machine cycle. The latch 42 or locking latch LL as it may otherwise be know, is reset at the end of the total machine cycle by conventional reset circuitry, not shown. This reset circuitry is also applied to all of the other latches and storage devices in the system.

Prior to the turning on of latch LL, each of a plurality of AND gates connected to the outputs of the threshold logic circuits, such as the AND gates 44, 46 and 48, have an input supplied to one of their input circuits from the "off" side of the latch LL, so that upon the occurrence of the output pulse from the logic circuit, it will find the associated gates 44, 46, 48, enabled by the common input from the locking latch 42.

The output from AND circuits 44, 46, 48 are supplied to associated storage latches such as L1A, L2A and L*n*A. As customary, these latches, when turned on by the input signals supplied thereto from the AND gates, will remain in their on condition until they are reset or turned off. By means of suitable output gating circuits, not shown, but conventional in the art, the outputs of the latches L1A, L2A and L*n*A may be supplied to output terminals OL1, OL2, and OL*n*, as well as to the inputs of a series of AND gates 50, 52 and 54.

As was noted above, the first output pulse from a threshold logic circuit which turns on as a result of the ramp signal being supplied thereto, initiates the timing operation of the single shot circuits 38 and 40, also designated as SS1 and SS2. SS1 is of shorter duration signal length than SS2.

On the assumption that no other threshold circuit turns on during the time that SS1 is supplying an output therefrom, the output of latch L1A will be supplied to terminal OL1 at the end of the machine cycle time by gating circuits associated with the latch.

Now let it be assumed that another threshold circuit turns on during the duration of the output signal of SS1. Under these conditions, a latch 56, also designated as L1, is turned on as a result of the signal supplied through OR circuit 34, to one input of an AND gate 58, the other input of which is governed by the output of the single shot 38. With signals present at both inputs of AND circuit 58, latch L1 is turned on and the "on" output therefrom is supplied to the reset circuitry of the latches L1A, L2A and L*n*A, to thereby turn off whichever one of these latches had originally been turned on. For example, in this instance, latch L1A would be turned off. Accordingly, when the output gate signal is later supplied, no output will be present at terminal OL1 under this condition.

Now the condition will be considered wherein no other threshold circuit turns on during the duration of the output signal of SS1, but that an additional threshold circuit, for example TLC2, does turn on during the duration of the output signal from SS2 but after SS1 turns off. Under these circumstances, a latch 60, otherwise designated as L2, is turned on by an output from an AND circuit 62, one input of which is supplied from the output of OR circuit 34, and the other input of which is supplied from the output of an AND circuit 64, the inputs of which include a signal from latch L1 that this latch is off, a signal from the "on" side of SS2 and a signal from the "off" side of SS1. At the same time, the output from AND circuit 64 is supplied as one input to an AND circuit 66, the other input of which is supplied from the "off" side of latch L2, and the output of AND circuit 66 is supplied to a plurality of AND circuits 68, 70, and 72 each supplying its output to an input to the "B" series of latches such as latches 74, 78, and 80, also designated as L1B, L2B, and L*n*B. When the output of AND circuit 66 is supplied to the one input of the AND circuits 68, 70 and 72, the other input will be enabled by whichever of the threshold circuits turned on later, in this instance TLC2, so that the output of AND circuit 70 causes latch 78, or L2B to turn on. The use of the "off" signal from latch L2 in the gating circuits for the "B" series of latches allows only the first threshold circuit that comes on in the interval determined by SS1 off and SS2 on to turn on its corresponding "B" latch.

Likewise, the use of the locking latch LL42, allows only the first signal through OR circuit 34 to trigger the single shots 38 and 40.

Under the last described situation, that is, with a second threshold circuit coming on during the time interval existing between the termination of the output from SS1 and the termination of the output from SS2, at the time of system readout or the end of the machine cycle, an output will be present at terminal OL1, and at the same time, suitable signals are fed back to the particular logic threshold circuits which came on, to either increment them in the direction to strengthen their response or to decrement them so as to weaken their response.

A signal is supplied to decrement threshold logic circuit TLC2, which signal is provided over the circuit including the line 82 connected to the output of latch 78 (L2B). In each instance, the signal lines supplied to the top left of the threshold logic circuit will be considered to control the decrementing, whereas the signal line at the top right of the symbol for the threshold logic circuit will be considered to be incrementing input. At this time, a signal is also supplied to threshold logic circuit TLC1, to cause it to increment. This signal is provided from the output of AND gate 50, one of the inputs being the output signal from latch L1A. The other input to AND circuit 50 is the output of an OR circuit 84, the inputs of which are connected to the outputs of the "B" series of latches, so that when any one of these latches is on, the OR circuit 84 is enabled to provide a common gating signal to the AND circuits which govern the incrementing circuits. Thus, a circuit is established at this time over the line 86 to the incrementing controls of threshold logic circuit TLC1, thereby causing this circuit to change its response so as to be even more responsive to the type of input pattern which has been presented.

The incrementing and decrementing signals supplied to the threshold logic circuits operate so that in response to a decrement signal, the magnitude of the signal generated by the associated threshold logic circuit is reduced if the output of that logic circuit does not correspond to the output actually desired. On the other hand, an increment signal causes the signal from the associated threshold logic circuit to increase still further in its magnitude, this action occurring when the output of the threshold logic circuit is the desired output signal.

From the foregoing, it can seen that by providing suitable timing periods during the response of the threshold logic circuits to the ramp signals, depending on the response thereof, either no further adaption need take place, or adaption may take place with the desired signal being accentuated and the undesired signals being reduced in magnitude, and the signal may be accepted or rejected.

Figure 2:
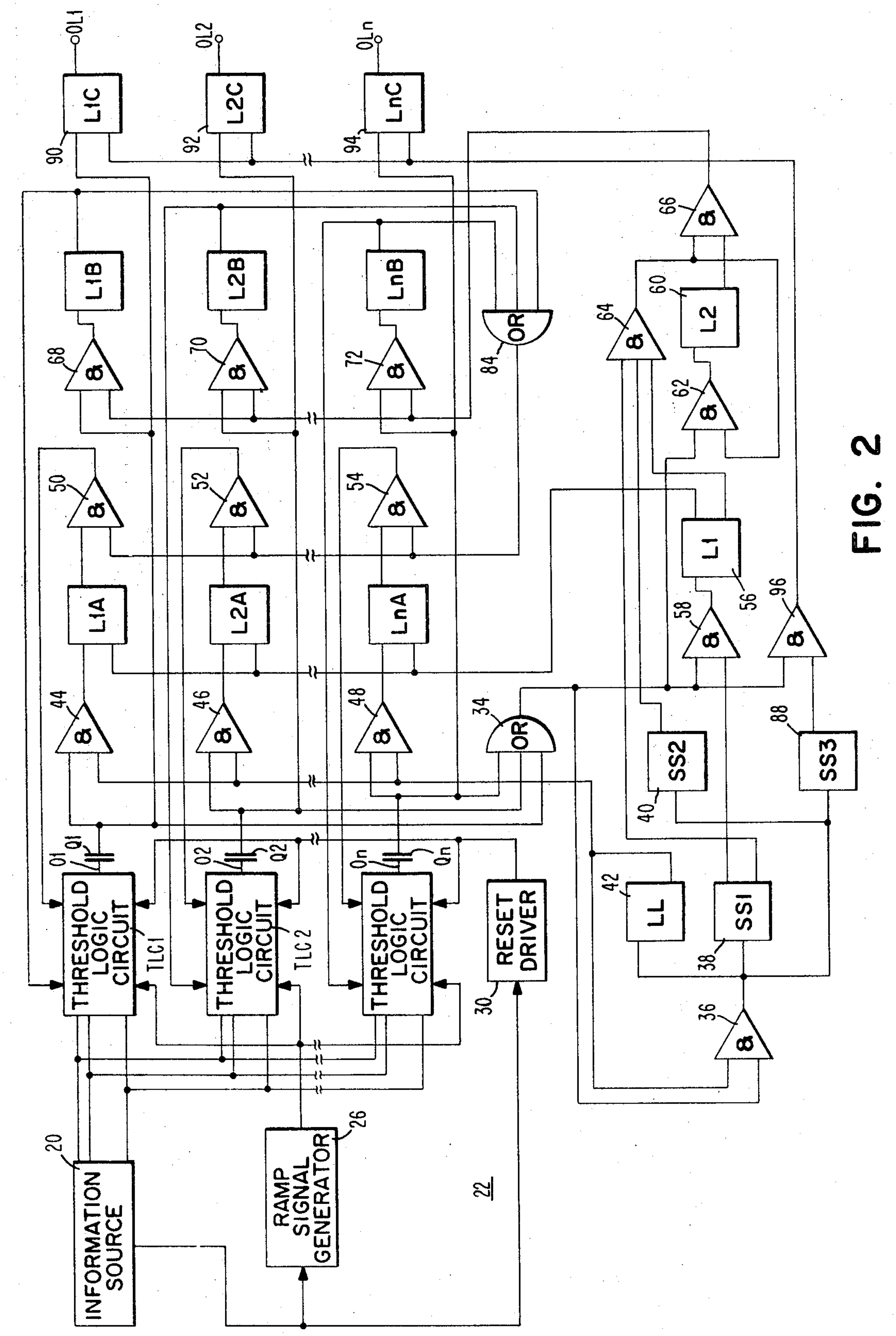
FIG. 2 is a schematic view of an adaptive logic system according to the second preferred embodiment of the present invention employing three time delay devices.

Now turning to FIG. 2 of the drawings, there is shown a system somewhat similar to that described above in connection with FIG. 1, except that in this instance, three timing devices are employed along with three sets of storage latches, so that the functions of recognition or rejection may be separated from the function of adaption of the system.

As shown in FIG. 2, in addition to the single shots SS1 and SS2, a third single shot SS3 designated by reference character 88 is also provided. The single shots 38 and 40, that is SS1 and SS2, are utilized to control the adaption only of the system, whereas single shot 88 (SS3) is utilized to control the recognition or rejection of a pattern only.

Three series of output latches are now provided, the "A" series being utilized to govern the incrementing function when required, the "B" series of latches governing the decrementing function for the threshold logic circuits, and the "C" latches providing the output signals to the terminals OL1, OL2 and OL*n*. The third series of latches include latches 90, 92 and 94, also designated as L1C, L2C and L*n*C, respectively.

With respect to the operation of the system shown in FIG. 2, the operation generally follows that described above in connection with FIG. 1. Thus, if any other threshold circuit turns on during the duration of the output signal from SS1, or if no other threshold circuit turns on during the duration of the output signal from SS2, no adaptive action will take place. If no other threshold circuit turns on during the duration of the output signal from SS1, but another during the duration of the output signal from SS2, adaption will take place, in the manner as previously described in connection with FIG. 1, by the energization of the appropriate ones of the "A" or the "B" latches. With respect to the single shot 88, (SS3), if any other threshold circuit turns on during the time that SS3 is supplying an output signal, then the combination of the output from OR 34 and the output of SS3 energizes both inputs of an AND circuit 96, the output of which resets all of the "C" series of latches namely 90, 92, and 94. Thus, the pattern is rejected and no output signal is provided under these circumstances. If no other threshold circuit turns on during the time that SS3 is on, the pattern will be recognized since no resetting signal is supplied to the output latches.

Thus, in the arrangement shown in FIG. 2, the controls of the adaption and the recognition or rejection functions have been separated, whereas in FIG. 1, the functions were combined, inasmuch as the single shot SS1 in FIG. 1 also governed the recognition or rejection function as well as the adaption function. The advantage of the arrangement shown in FIG. 2 is that the operation of the scheme is more general, permitting more freedom in the selection of criteria for recognition or rejection and the criteria for adapation. For example, SS3 may have a shorter output signal duration than SS1, thus allowing for a range in which patterns might be accepted for recognition but not for adaption.

Figure 3:
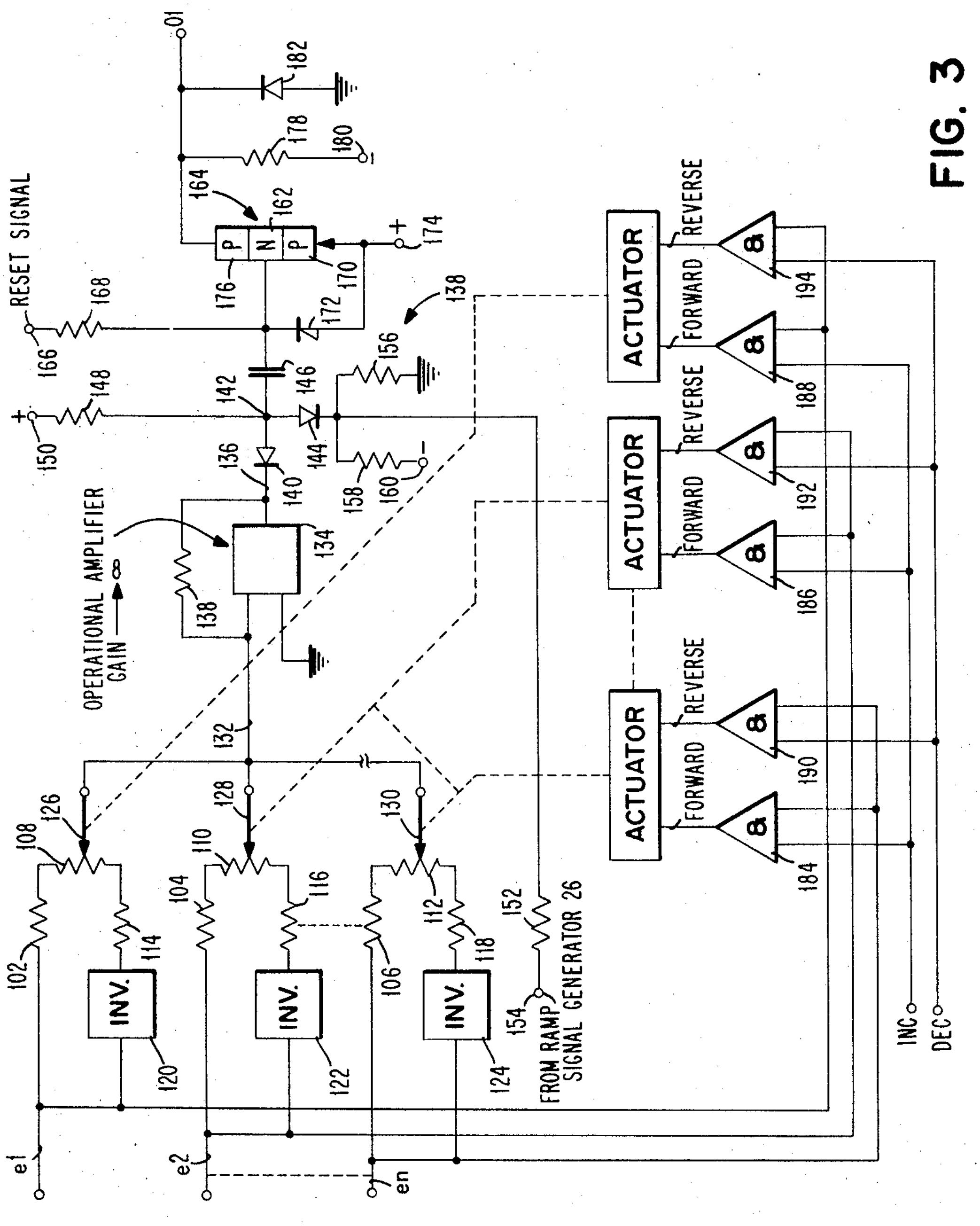
FIG. 3 is a diagrammatic view illustrating one type of threshold logic device which may be used with the subject invention.

Referring now to FIG. 3 of the drawings, there is shown in schematic form, one type of threshold logic circuit which may be employed with the subject invention. There are many types of threshold logic circuits and devices already known in the art, and it should be clearly understood that the form shown in FIG. 3 and to be described subsequently is exemplary only since other devices of this type may be readily substituted in the system.

The signals on lines *e*1, *e*2 and *en* from the information source 20 of FIGS. 1 and 2 are applied through a plurality of resistors 102, 104 and 106, respectively to one side of potentiometers or variable voltage dividers 108, 110, and 112. The other side of these voltage dividers are coupled via resistors 114, 116 and 118 to the outputs of associated inverters 120, 122 and 124 which have input signals supplied thereto from the lines *e*1, *e*2 and *en*.

The movable contact 26, 128 and 130 of the potentiometers 108, 110 and 112 are electrically connected to a common conductor 132 which serves as an input to an operational amplifier 134, the other input of which is grounded. The output of the operational amplifier appearing on a conductor 136 is fed back to the input conductor 132 via a feedback resistor 138.

The gain of the operational amplifier 134 is chosen sufficiently high so that for all practical purposes, it may be considered as approaching infinity. In this case, the input conductance of the amplifier is virtually equal to zero with respect to the conductances looking into the potentiometers 108, 110 and 112. In this respect, the associated input resistors connected to the potentiometers insure that none of these conductances can approach zero thereby maintaining this relationship.

The currents which flow in the movable potentiometer contacts 126, 128 and 130 are directly related to the potentials on the input lines *e*1, *e*2, and *en* as modified or "weighted" by the settings of the potentiometers. These currents are summed in the conductor 132 and supplied to the input of the operational amplifier 134. The output signal of the operational amplifier is a potential representative of the sum of the currents flowing in the input conductor 132.

The signal at the conductor 136 is coupled to a circuit 138 which is the same as that shown in a portion of FIG. 1 of U.S. Pat. No. 3,290,517, issued Dec. 6, 1966, for Threshold Logic Circuit System.

The circuit 138 includes a diode 140 which couples the conductor 136 to a junction 142, to which are also coupled a diode 144, a capacitor 146 and a resistor 148. Resistor 148 is supplied with a suitable positive potential at a terminal 150. The diode 144 is coupled through a resistor 152 to a terminal 154 which receives the signal from the ramp signal generator 26 of FIGS. 1 and 2. Diode 144 is also coupled to a common potential such as ground through a resistor 156 as well as to a source of negative potential through a resistor 158 to a negative potential terminal 160. Capacitor 146 is coupled to the base 162 of a PNP resistor 164 as well as to a terminal 166 via a resistor 168. Base 162 and emitter 170 of the transistor 164 are coupled together through a tunnel diode 172. The tunnel diode and the emitter are coupled to a source of positive potential applied at a terminal 174. Collector 176 of transistor 164 is coupled to output terminal, such as 01, and is also connected through a resistor 178 to a terminal 180 of a negative potential and to ground through a diode 182.

A reset signal applied to the terminal 166 places the tunnel diode 172 in the lower of its two voltage states. This results in transistor 164 being placed in a state of non-conduction, lowering the potential of the output conductor. Diode 182 acts as a clamp to prevent the potential of the output conductor from going below ground level.

Following the application of the reset signal to terminal 166, the ramp signal applied to terminal 154 commences. The ramp signal at the junction of the resistor 152 and diode 144 commences at a potential which is higher than the potential of the conductor 136 representing the sum of the input signals as weighted by the potentiometers. Diode 140 is forwardly biased and conductive, while diode 144 is back biased and non-conductive. The output potential of the operational amplifier 134 plus the forward drop of diode 140 is thus applied to the junction 142. The potential at junction 142 remains constant at this value for as long as the ramp signal exceeds the potential of the conductor 136, assuming that the diodes 140 and 144 are a matched pair.

When the potential of the decreasing ramp signal supplied to the junction of resistor 152 and diode 144 is equal to the potential of the conductor 136, the diode 144 becomes forwardly biased and conductive and diode 140 becomes back biased and non-conductive. The potential of the junction 142 thus commences to fall following the falling ramp signal. This change in the potential of the junction is communicated through the capacitor 146 to the tunnel diode 172 which then switches to its higher voltage state. The transistor 164 is accordingly switched on and conducts, which raises the potential at the output terminal 01 to produce a positive output signal. This signal suplied via the capacitor shown associated with each of the threshold logic circuits in FIGS. 1 and 2, is the output signal that sets the associated latches and starts the timing operation as described above.

The incrementing and decrementing action in the threshold circuit shown in FIG. 3 may be described as follows: The increment signal line connected to the terminal designated INC suplies an enabling input to each of a plurality of AND circuits, one for each of the inputs to the threshold logic circuit, such as the AND circuit 184, 186 and 188, while the signal on the decrementing line supplied from the terminal designated DEC, is utilized as an enabling input to a second plurality of AND circuits 190, 192 and 194.

AND gates 188 and 194 provide forward and reverse signals respectively to an actuator which operates the movable contact 126 of the potentiometer 108. Similarly, AND circuits 186 and 192 provide forward and reverse control signals to an actuator associated with the movable contact arm 128 of potentiometer 110 and AND circuits 184 and 190 provide forward and reverse controls to an actuator associated with the movable contact arm 130 of the potentiometer 112. Each of AND gates 188 and 194 receive an input signal from the terminal *e*1, AND circuits 186 and 192 each receive an input signal from the terminal *e*2, and finally, each of AND circuits 184 and 190 receive an input from the terminal *en*.

Let it now be assumed that a signal is present on the line connected to the terminal INC indicating that the threshold logic unit should be incremented for whatever signals are present at the input. Accordingly, each of the AND gates 184, 186 and 188 has one input thereof energized. At the same time, if signals are present on any one or more of the terminals *e*1, *e*2, . . . *en*, then the associated AND circuits will provide an output to the selected one of the actuators to cause the actuator to move its associaed contact arm to increment the weighting of he associated ones of the active signals suplied to the terminals *e*1, *e*2–*en* at that time and to thereby increase the signal developed by the operational amplifier 134. The actuators themselves may take the form of devices such as stepping switches or other devices which typically change the associated potentiometer contacts each by a unit amount for each control signal supplied thereto.

If a decrement signal is supplied to the terminal DEC, a similar operation takes place in accordance with the supply to the mounts *e*1, *e*2, *en* of active input signals, causing the associated actuators to operate in a reverse direction to thereby decrease the weighting provided by the potentiometers and hence to decrease the magnitude of the signal developed by operational amplifier 134.

It should be noted that the inverters 120, 122 and 124 connected to the inputs *e*1, *e*2 and *en* also permit negative weights to be employed in the weighting of the input signals.

By changing the weighting of the active signals supplied to the inputs of the threshold logic unit, the output signal from the operational amplifier is changed so as to change the time and cycle when the output conductor of the threshold logic unit is energized to supply an appropriate signal to he remainder of the system as shown in FIG. 1 or FIG. 2.

From the foregoing, it will be seen that the present invention provides an adaptive logic system in which the system is arranged so that unsupervised learning can take place once the system has been initially trained to accept particular inputs. This feature is accomplished by utilizing particular time delays which recognize the activation of threshold logic units in such manner that the degree of correspondence to the desired condition can be discerned and that appropriate incrementing or decrementing of the weights of the logic units can thereby be controlled.

While the invention has been particularly shown and described with reference to two preferred embodiments thereof, it will be understood by those skilled in the art that various changes in form and details may be made therein without departing from the spirit and scope of the invention.

What is claimed is:

1. In an adaptive logic system employing unsupervised learning, the combination comprising, a plurality of input signal means for supplying input signals to the system, a plurality of threshold logic units each corresponding to a particular output of said system, each of said units being connected to said plurality of input signal means, each unit including weighting means for weighting the input signals and summing means for summing the weighted input signals to provide a sum output signal, detecting means for detecting the threshold logic unit generating the largest sum output signal and those logic units generating sum output signals within a first and a second predetermined range from the largest sum output signal, and modifying means for adjusting the weighting means of said threshold logic units to increment the weight of the logic unit generating the largest sum output signal and falling within said second range but not in said first range and to decrement the weight of other logic units generating an output signal and falling within said second range but not in said first range, said modifying means maintaining the weighting of a logic unit having a sum output signal falling within said first range, or beyond said second range.

2. An adaptive logic system as claimed in claim 1, in which said detecting means also includes means for detecting a third range of outputs of said logic units, and control means governed by said detecting means for suppressing all outputs if a second threshold unit provides a sum output signal falling in said third range.

3. An adaptive logic system as claimed in claim 1, in which said threshold logic circuits are supplied with a time varying signal which is compared with the sum output signal of each unit to thereby select the sum output signal having the highest value, said detecting means further including means for determining a plurality of timing intervals commencing with the output signal of the highest valued threshold logic circuit, and said modifying means being governed by said detecting means for incrementing and decrementing said logic circuits in accordance with the presence or absence of outputs from other logic circuits following the output of the first logic circuit.

4. An adaptive logic system as claimed in claim 3, in which said detecting means includes at least two timing devices for determining said timing intervals, said timing devices having an operating cycle initiated by the output of the first, and only the first threshold logic circuit which supplies an output indicative of maximum response.

5. An adaptive logic system as claimed in claim 4, in which said detecting means includes an additional timing device governed by the output of the first of said logic circuits to supply an output signal, and effective to provide an acceptance or rejection of the output of said system in accordance with the presence or absence of outputs from other logic circuits following the output of the first of said logic circuits to supply a said output.

6. An adaptive logic system as claimed in claim 4 in which the output of said logic circuits are stored in a corresponding plurality of memory devices in accordance with the time interval in which they occur.

7. An adaptive logic system as claimed in claim 6, in which the outputs of said storage devices are supplied to said modifying means to control the incrementing or the decrementing of the associated threshold logic circuit.

References Cited

UNITED STATES PATENTS

| | | | |
|---|---|---|---|
| 3,273,125 | 9/1966 | Jakowatz | 307—201 |
| 3,446,950 | 5/1969 | King | 340—146.3 |

DONALD D. FORRER, Primary Examiner

H. A. DIXON, Assistant Examiner

U.S. Cl. X.R.

307—235; 340—146.3